(12) United States Patent
Poirier et al.

(10) Patent No.: US 12,083,528 B2
(45) Date of Patent: Sep. 10, 2024

(54) METHOD AND INSTALLATION FOR CRYOGENIC CRUSHING OF PRODUCTS

(71) Applicant: L'Air Liquide, Société Anonyme pour l'Etude et l'Exploitation des Procédés Georges Claude, Paris (FR)

(72) Inventors: Alban Poirier, Le Chesnay (FR); Alain Cloarec, Bagneux (FR); Etienne Charve, Vanves (FR); Olivier Pouchain, Reze (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 518 days.

(21) Appl. No.: 17/420,420

(22) PCT Filed: Dec. 23, 2019

(86) PCT No.: PCT/FR2019/053274
§ 371 (c)(1),
(2) Date: Jul. 2, 2021

(87) PCT Pub. No.: WO2020/141272
PCT Pub. Date: Jul. 9, 2020

(65) Prior Publication Data
US 2022/0080428 A1    Mar. 17, 2022

(30) Foreign Application Priority Data
Jan. 3, 2019   (FR) ...................................... 1900024

(51) Int. Cl.
*B02C 19/18*   (2006.01)
*B02C 18/22*   (2006.01)
*B02C 23/02*   (2006.01)

(52) U.S. Cl.
CPC ............ *B02C 19/186* (2013.01); *B02C 23/02* (2013.01)

(58) Field of Classification Search
CPC ... B02C 19/186; B02C 23/02; B02C 18/2258; B02C 18/2291; Y02P 70/10
(Continued)

(56) References Cited

U.S. PATENT DOCUMENTS 3,771,729 A * 11/1973 Frable ..................... B29B 13/10
                                                                  241/23
4,273,294 A *  6/1981 Hollely ............... B29B 17/0408
                                                                  241/23

(Continued)

FOREIGN PATENT DOCUMENTS

CN     107 413 487       12/2017
DE     200 01 065         5/2000
(Continued)

OTHER PUBLICATIONS

English translate (DE20001065U1), retrieved date Nov. 14, 2023.*
International Search Report for corresponding PCT/FR2019/053274, Jun. 9, 2020.

*Primary Examiner* — Mohammed S. Alawadi
(74) *Attorney, Agent, or Firm* — Elwood L. Haynes

(57) ABSTRACT

A plant for grinding a product, which includes a grinder in which the product is ground, which plant also includes a hopper for supplying the grinder with product to be ground, configured to be supplied with product to be ground; a means for bringing a cryogenic fluid into the hopper; and a means for discharging product from the hopper into the grinder. Wherein the hopper is provided in a lower part with a hollow screw provided with turns allowing the product to be discharged out of the hopper, into the grinder; and the means for bringing a cryogenic fluid into the hopper comprise an injection lance which is positioned inside the turns (Continued)

of the hollow screw, extending in a direction substantially parallel to the axis of the screw.

2 Claims, 2 Drawing Sheets

(58) Field of Classification Search
USPC .............................................. 241/37, 38, 65
See application file for complete search history.

(56) References Cited

U.S. PATENT DOCUMENTS

2013/0112786 A1* 5/2013 Bausch ................. B02C 19/186
 241/38
2017/0056890 A1* 3/2017 Fischer ................... B02C 23/20

FOREIGN PATENT DOCUMENTS

| | | | |
|---|---|---|---|
| DE | 20001065 U1 * | 5/2000 | ........... B02C 19/186 |
| FR | 2 142 523 | 1/1973 | |
| GB | 1 397 793 | 6/1975 | |
| JP | H05 009649 | 2/1993 | |

* cited by examiner

METHOD AND INSTALLATION FOR CRYOGENIC CRUSHING OF PRODUCTS

CROSS REFERENCE TO RELATED APPLICATIONS

This application is a 371 of International Application No. PCT/FR2019/053273, filed Dec. 23, 2019, which claims priority to French Patent Application No. 1900024, filed Jan. 3, 2019, the entire contents of which are incorporated herein by reference.

BACKGROUND

The present invention relates to the field of methods for the cryogrinding (grinding under cryogenic cooling conditions), or grinding under controlled temperature conditions, of products and materials, these methods being implemented in particular in the field of plastics, chemical powders, or even food products.

In this technical field, plants are known in particular that operate in the following configuration: the plant implements a cryogenic transfer screw that is supplied with liquid nitrogen by a spraying rail so as to (pre)cool the product, usually so as to cool it down to the embrittlement temperature of the material, the product then being delivered into the grinder by the screw.

The structure of these screws (screw with a solid central drive shaft, of the Archimedes screw type or screw with central shaft and blades on this shaft), which is well known to those skilled in the art, will not be described in detail here.

Plants are also known in which the grinder is supplied with product by a hopper, provided with a rotary valve at the hopper outlet so as to transfer the product to the grinder, whether this hopper has a pyramidal or cylindrical base.

The experiments successfully carried out by the applicant have been able to demonstrate that these prior plants had the following drawbacks:

1. the cryogenic screws mentioned above are characterized by an overconsumption of cryogen and difficulties in regulating the cooling since these prior plants implement a single regulation for the screw+grinder assembly, with a regulating thermocouple situated at the grinder outlet, but also by the following aspects:
   great difficulties in cleaning such a screw,
   the fact that the cryogen is injected into the gas headspace of the screw and therefore not directly into the product, this giving rise to a low yield,
   the residence time of the product is short;
2. with regard to the other type of plant, difficulties associated with the rotary valve present at the hopper outlet, the flow rate of which is not sufficiently stable.

SUMMARY

One of the objectives of the present invention is therefore to propose a new technical cryogrinding solution.

As will be seen in more detail below, the present invention proposes a cryogrinding plant implementing the following elements:

1. the implementation of a hopper for supplying products to be ground, the hopper itself being supplied with product to be ground, the cryogen (for example liquid nitrogen) is supplied to the hopper via very original means that will be described in detail below, the hopper is provided in its lower part with what can be called a "hollow" screw, i.e. a spring provided with turns (without a central shaft), allowing the product to be discharged out of the of the hopper, a hollow screw that, as will have been understood, replaces the rotary valve and the cryogenic screw that are known according to the prior art. Such a hopper equipped with such a hollow screw can also be designated by the term "volumetric metering hopper".
2. the products to be ground are therefore cooled to a controlled temperature, or even to the embrittlement temperature of the product, in this hopper, before being discharged into the grinder via the hollow screw.
3. the supplying of cryogen into the hopper is carried out, in whole or in part, using an injection lance (of the manifold type with orifices), positioned within (inside) the hollow screw, i.e. within its turns. According to the invention, it is possible to involve, in addition to this injection lance, an additional means for feeding cryogen into the hopper (for example those that are conventionally used, such as an injection torus), but this solution is not preferred according to the invention.

The structure of such injection manifolds, which are well known to those skilled in the art of gases, of which the dimensioning and in particular the number of injection holes will be determined on a case-by-case basis by a thermal calculation of frigories needed for the maximum product flow rate, will not be insisted upon here.

This localization of the injection lance proves particularly advantageous since being able to inject into the core of the hollow transfer screw thus makes it possible that:
   since the product necessarily passes into this lower part of the hopper and within the transfer screw, better uniformity of cooling is thus ensured;
   given the localization of the cryogen injection, the cryogen will potentially be able to dissipate throughout the mass of product in the hopper;
   the residence time of the cryogen is longer, this providing a better yield of the frigories of the cryogen (a conventional transfer screw, with a central shaft, is equipped with a rail in the gas zone, the yield of the frigories is then limited by the sublimation of the nitrogen in the gas headspace and not in the product); The residence time is longer in this case because the (cold) gas is extracted from the upper part of the hopper and therefore passes through the entire mass of product in the hopper.
   moreover, the use of a hollow screw makes it possible to achieve a flow rate that is much more stable compared with what is observed with the rotary valve of the prior art that itself operates with jolts.
4. According to an advantageous embodiment of the invention, the injection into the lance is regulated (and if an additional torus is present, the injection into this torus is advantageously also regulated), using a measurement of the temperature (preferentially by thermocouple) at the outlet of the hollow transfer screw, in the zone in which the product leaves the screw toward the grinder (in this zone, the product drops, it is no longer in the hollow screw), all or nothing regulation, or preferentially PID regulation with an all or nothing valve, or even a proportional valve for the injection lance and an all or nothing valve for the remainder of the torus in the hopper.

According to one of the implementations of the invention, in addition to this feeding of cryogen into the hopper, it is possible to implement an injection of cryogen into the actual grinder, this being known per se, but in an injection that is then completely independent of that of the hopper.

According to one of the embodiments of the invention, it is possible to vacuum insulate all or part of the injection lance.

The regulation of the temperature in the grinder (so as to overcome the creation of heat on account of the grinding) is in this case independent of the regulation of the hopper and is not disturbed by the injection of cryogen, for example liquid nitrogen, into the hopper.

As has been seen, according to one of the embodiments of the invention, the regulation of the injection of cryogen into the lance is carried out by a measurement of the temperature of the product to be ground (preferentially by thermocouple) at the outlet of the hollow screw in the zone in which the product leaves the screw toward the grinder, preferentially in the zone in which the product drops toward the grinder, therefore as close as possible to the product leaving the transfer screw.

The gaseous nitrogen extracted from the hopper is advantageously reinjected into the grinder so as to recover energy.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
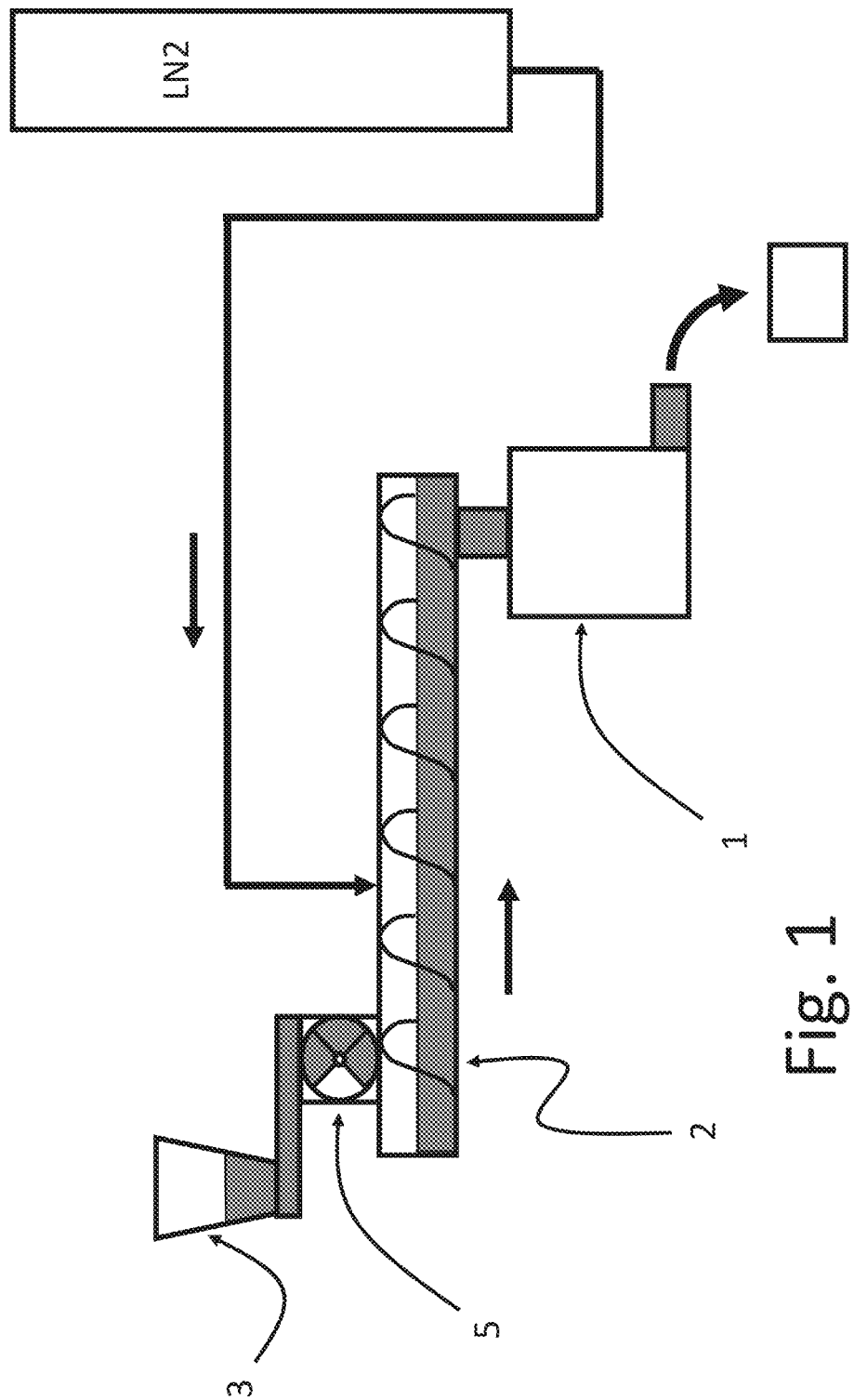
FIG. 1 illustrates a schematic representation of one embodiment of the present invention.

The appended FIG. 1 gives a partial schematic view of a plant in accordance with the prior art, in which the following elements can be recognized:
  the grinder 1 is supplied with product to be ground by a transfer screw 2 (screw with a central shaft);
  the screw is itself supplied with product to be ground by a hopper 3, provided with a rotary valve 5 that was mentioned above;
  the product is pre-cooled in the screw by the fact that the screw is supplied with liquid nitrogen, for example by virtue of a spraying rail, the product then being delivered by the screw into the grinder 1.

Figure 2:
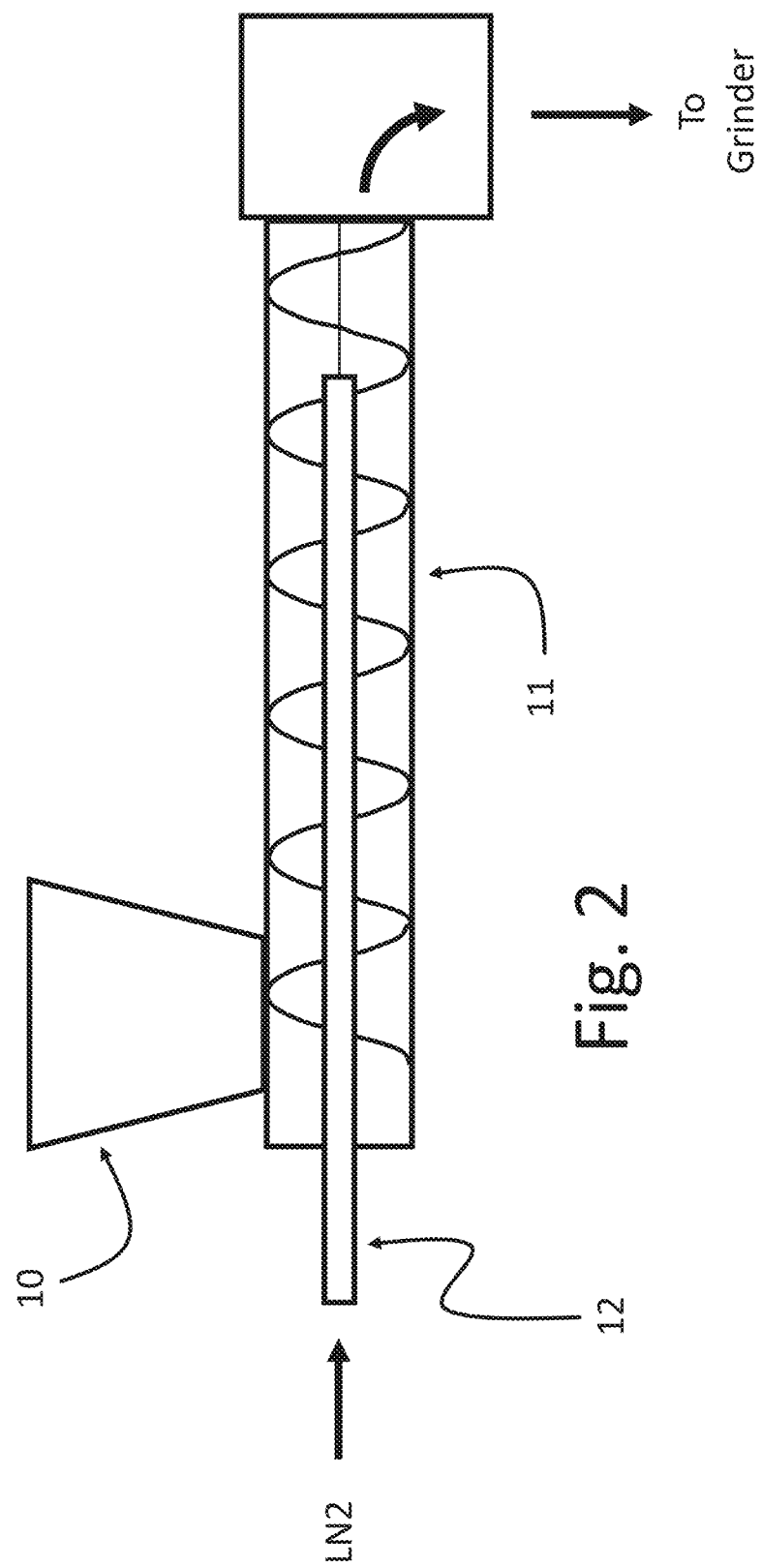
FIG. 2 illustrates a schematic representation of another embodiment of the present invention.

The appended FIG. 2 provides a partial schematic view of the lower part of a hopper 10 in accordance with the invention, provided with a hollow transfer screw 11 and with a cryogen injection lance 12 situated within the hollow screw 11, i.e. within the rings of the hollow screw.

The results of the experiments carried out by the applicant under these conditions showed the following points:
  a substantial saving in nitrogen consumption compared with a conventional technology such as mentioned above implementing a transfer screw with a central shaft (for example an Archimedes screw): a saving of the order of 20%.
  a substantial improvement in the cleanability of the plant (it will be understood that such a hollow screw is much easier to clean than the screws of the prior art without the need for further elaboration).
  it was possible to confirm that the hollow screw makes it possible to achieve a much more stable product flow rate than a rotary valve of the prior art (no blockages, no jolts), and therefore a much better stability of the conditions of flow rate/temperature of the product that enters the grinder, leading to a much more targeted final particle size.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A plant for grinding a product, comprising a grinder wherein the plant comprising:
  a hopper for supplying the grinder with a product to be ground, configured to be supplied with the product to be ground;
  a means for bringing a cryogenic fluid into the hopper;
  a means for discharging product to be ground from the hopper into the grinder;
wherein:
  the hopper is provided in a lower part with a hollow screw provided with turns allowing the product to be ground to be discharged out of the hopper, into the grinder;
  the means for bringing the cryogenic fluid into the hopper comprise an injection lance which is positioned inside the turns of the hollow screw, extending in a direction substantially parallel to an axis of the screw.

2. A method for grinding a product in a grinder, comprising:
  supplying the grinder with a product to be ground by a feed hopper, which is itself supplied with the product to be ground;
  cooling the product to be ground to a controlled temperature or to an embrittlement temperature of the product to be ground, in the hopper, before being discharged into the grinder, by admission of a cryogen into the hopper;
wherein:
  the hopper is provided in a lower part with a hollow screw provided with turns allowing the product to be ground to be discharged out of the hopper into the grinder; and
  the cryogen is supplied to the hopper via an injection lance that is positioned inside the turns of the screw, extending in a direction parallel to an axis of the screw.

* * * * *